(12) United States Patent
Cooper

(10) Patent No.: US 6,611,795 B2
(45) Date of Patent: Aug. 26, 2003

(54) APPARATUS AND METHOD FOR PROVIDING ADAPTIVE FORWARD ERROR CORRECTION UTILIZING THE ERROR VECTOR MAGNITUDE METRIC

(75) Inventor: Michael J. Cooper, Marietta, GA (US)

(73) Assignee: Motorola, Inc., Schaumburg, IL (US)

( * ) Notice: Subject to any disclaimer, the term of this patent is extended or adjusted under 35 U.S.C. 154(b) by 98 days.

(21) Appl. No.: 09/730,986

(22) Filed: Dec. 6, 2000

(65) Prior Publication Data

US 2002/0069038 A1 Jun. 6, 2002

(51) Int. Cl.[7] .............................................. H04B 15/00
(52) U.S. Cl. .......................... 702/191; 702/69; 702/71; 706/14; 714/2; 714/16; 714/774; 714/751; 714/746; 714/798; 455/63; 455/67.3; 375/240.02; 375/240.06; 375/240.27; 375/243
(58) Field of Search ........................ 341/50, 51; 714/1, 714/799, 798, 746; 455/63, 67.3; 706/14, 17, 21, 16; 704/219, 226, 201, 237, 240, 253; 340/2.1, 7.44; 702/69, 71, 73, 75, 122, 124, 126, 182, 189, 191

(56) References Cited

U.S. PATENT DOCUMENTS 5,200,962 A * 4/1993 Kao et al. ..................... 371/41
5,699,365 A   12/1997 Klayman et al.
5,699,369 A   12/1997 Guha
5,870,412 A   2/1999 Schuster et al.

OTHER PUBLICATIONS

Lavon B. Page, Probability for Engineering, with Applications to Reliability, 1989, Computer Science Press, pp. 73–75.*

Probability and Statistical Inference Second Edition, by Robert V. Hogg and Elliot A. Tanis, 1983, Sections 5.6, 5.3, 5.4, 5.5.

Digital Communication Receivers—Synchronization, Channel Estimation, and Signal Processing, by Heinrich Meyr, Marc Meneclaey and Stefan A. Fechtel, 1998.

* cited by examiner

Primary Examiner—Marc S. Hoff
Assistant Examiner—Elias Desta
(74) Attorney, Agent, or Firm—James A. Lamb; Heather L. Mansfield; Jeanne N. Pappas

(57) ABSTRACT

An adaptive forward error correction technique based on noise bursts and the rate at which they occur is disclosed. The forward error correction parameters are determined using statistics describing the noise burst duration and period. The occurrence, duration and period of the noise burst are determined by the error vector magnitude calculated during the decoding process.

31 Claims, 4 Drawing Sheets

APPARATUS AND METHOD FOR PROVIDING ADAPTIVE FORWARD ERROR CORRECTION UTILIZING THE ERROR VECTOR MAGNITUDE METRIC

FIELD OF THE INVENTION

The invention relates, in general, to data communications and data communications systems and devices and, more specifically, to an apparatus and method for adaptively providing optimized forward error correction in a data communications system, where the optimization is based on the predicted occurrence of noise bursts.

BACKGROUND OF THE INVENTION

The transmission of information in digital form continues to grow at an exponential rate. Analog source information including text, video, audio, and multimedia, is digitized for transmission over a wireless or wire-based communications network. Generally, with the exception of baseband communications schemes, the digital information modulates a radio frequency carrier signal for efficient transmission over the communications medium. The information can be carried over the communications link continuously or in packets, and further can be time or frequency multiplexed to provide more efficient use of the channel by multiple users.

One such specific communications system employing digitally encoded video, voice and other forms of data, is the CableComm™ System currently deployed by Motorola, Inc., of Schaumburg, Ill. In the CableComm™ System, a hybrid optical fiber and coaxial cable provides substantial bandwidth to receiving stations, such as individual subscriber access units located at, for example, households having cable television capability. The coaxial and fiber cables are further connected to fiber optical cables terminating at a central location (referred to as the "head end") where controlling, receiving and transmitting equipment resides. The head end equipment may be connected to any variety of network or other information sources, such as the Internet, online services, telephone networks, and video/movie subscriber services. With the CableComm™ System, digital data can be transmitted both in the downstream direction, from the head end to an individual user, or in the upstream direction, from the user to the head end.

In one embodiment of the CableComm™ System, downstream data is transmitted using 64 quadrature amplitude modulation (QAM) at a rate of 30 Mbps (megabits per second), over 6 MHz bandwidth channels in the frequency spectrum of 88–860 MHz. Anticipating asymmetrical requirements with a significantly greater quantity of data tending to be transmitted in the downstream direction than in the upstream direction, less capacity is provided for upstream data transmission. The upstream channel utilizes PI/4 differential quadrature phase shift keying (PI/4-DQPSK) modulation in the frequency band from 5–42 MHz with a symbol rate of 384 ksymbols/sec with 2 bits/symbol. In addition, the communication system is designed to have a multipoint configuration, i.e., many end users transmitting upstream to the head end, with one or more head end stations transmitting downstream to the end users. The communications system is designed for asynchronous transmission, with users independently transmitting and receiving packets of encoded digital data, such as video or text files. Transmission of this data type are generally bursty, with users receiving or transmitting data at indeterminate intervals over selected channels in accordance with polling, contention, or other protocols established at the head end, rather than transmitting more or less continuously with synchronous streams of information over a dedicated or circuit switched connection.

For asynchronous data transmission, it is desirable to organize the data into recognizable frames or packets for reliable detection by the receiver. In the CableComm™ System, the preamble of the data packet contains timing and synchronization information to ensure accurate data reception and decoding. The timing information is followed by the source information or application information, which may be encoded for both security (encryption) and for error detection and correction. Forward error correction checksum information (in the form of bits appended to the source information or the application information) allows both error detection and error correction.

Impairments in the transmission channel and failures within the communication devices inevitably produce errors in one or more bits, (which are especially troublesome when they occur in the information portion of the transmitted word), and it is therefore desirable to detect and if possible correct such errors during the decoding process at the receiving end. The basic premise of error detection and correction (referred to as forward error correction) is to transmit additional bits, referred to as check bits (or check bytes, checksum bits or forward error correcting bits), in addition to the information data. Forward error correction requires the transmission of more bits than are necessary to transmit only the information, where these bits are appended to the transmitted word so that error detection and correction processes can be executed at the receiving end.

One difficulty arising from the inclusion of error correction information is the attendant increase in overall word or packet size, adding overhead for data transmission and correspondingly decreasing data through-put. Also, the inclusion of error correction information typically increases the system response time or latency, due to the extra time consumed at the receiving end to decode the checksum word, and, if necessary, correct errors in the data word. To constrain the extra error correction overhead, at least to a degree, the number of data errors that can be corrected, referred to as the forward error correcting power, is selected to meet the required performance demands of the communications system. However, the amount of overhead incurred by the system is directly proportional to the selected forward error correcting power. There may be some situations, such as low noise conditions, in which the forward error correcting power is "excessive", and therefore a higher data through-put can be achieved by reducing the forward error correction power. But, if insufficient correcting power is applied, the overall system through-put performance suffers due to errors in the transmitted data that the correction scheme cannot correct, thereby necessitating the retransmission of the uncorrectable words. Ideally, the correcting power applied should be matched to the impairment level of the communications channel. Various prior art methods are known for providing error correction capability, however, typically these methods utilize a fixed error correction capability, without regard to the specific noise conditions of the channel and the possible opportunities to increase data through-put and decrease response latency when lower than expected noise conditions are present.

Since the impairment or noise levels on a channel may vary with time, an adaptable and flexible error correction capability, which provides sufficient error correction for accurate data reception, while simultaneously minimizing overhead for increased data through-put, is required. U.S.

Pat. No. 5,699,365, assigned to the assignee of the present invention, provides a limited degree of adaptable and flexible error correction capability. The apparatus and method disclosed in the patent monitors a parameter of the communications channel and then compares the actual parametric value with a threshold level. If the monitored parameter is not within a threshold value, an additional degree of forward error correction is added to the transmitted bit stream. Disadvantageously, this prior art mechanism lacks the ability to quantitatively determine the optimal forward error correction correcting power to be applied at a given time over a given communications channel. The prior art is focused on revising forward error correction parameters as a result of an error term, specifically bit error, packet error, frame error, etc. Further, such an approach relies on reaching the best solution by slowly adapting to the new noise conditions, it does not make an instantaneous assessment of the best forward error correction configuration. The present invention addresses this problem by characterizing the noise and analyzing the noise characteristics to select the optimized parameters for forward error correction. The present invention does not rely on a traditional feedback control loop that must adapt over time.

BRIEF DESCRIPTION OF THE DRAWINGS

The present invention can be more easily understood and the further advantages and uses thereof more readily apparent, when considered in view of the description of the preferred embodiments and the following figures in which.

DETAILED DESCRIPTION OF THE PREFERRED EMBODIMENTS

Figure 1:
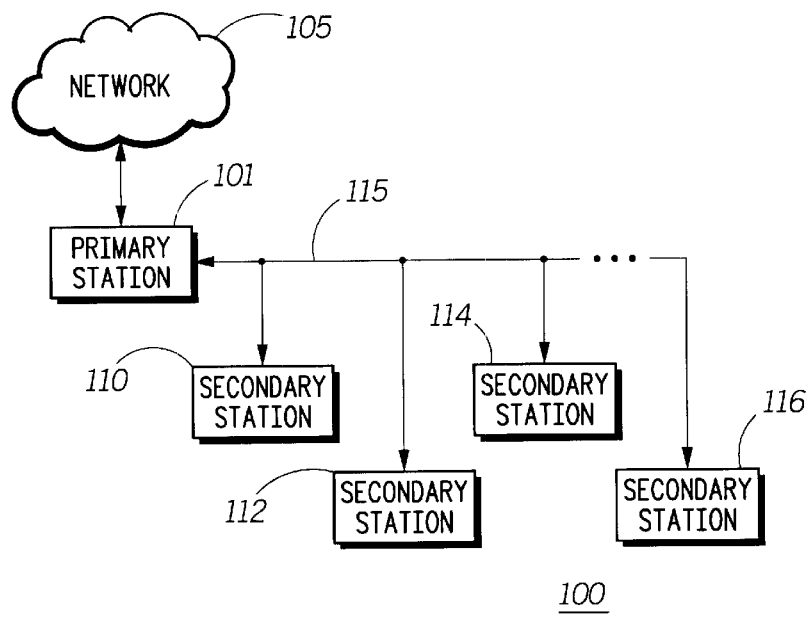
FIG. 1 is a block diagram illustrating a communication system in accordance with the present invention.

Before describing in detail the particular forward error correction method and apparatus in accordance with the present invention, it should be observed that the present invention resides primarily in a combination of steps and apparatus related to forward error correction. Accordingly, the hardware components and method steps have been represented by conventional elements in the drawings, showing only those specific details that are pertinent to the present invention so as not to obscure the disclosure with structural details that will be readily apparent to those skilled in the art having the benefit of the description herein.

As discussed above, there remains a need for a method and apparatus to provide adaptive forward error correction in a communications system in the presence of bursty or impulse noise on the communication channel, e.g., noise that appears suddenly on the channel, has a relatively short duration, then suddenly disappears. Several such noise bursts may occur in quick succession, after which the channel is quiet for a period. Certain prior art techniques may take relatively long to adapt to the noise burst and to readapt after the burst is over. The apparatus and method in accordance with the present invention determines statistical characteristics of the duration and period of noise bursts and then determines the optimal forward error correction parameters required to overcome the effects of the noise. Therefore, the present invention provides improved forward error correction in a dynamically changing noise environment. Statistical techniques are employed to establish the forward error correction parameters, thereby improving forward error correction parameter optimization (due to the improved noise characterization), while minimizing overhead and latency, thereby providing increased data throughput. Advantageously, the apparatus and method of the present invention predictably responds to changing noise-related conditions on the communications channel and establishes the optimal forward error correcting power based on those predictions.

FIG. 1 is a block diagram illustrating a communications system 100 in accordance with the teachings of the present invention. The communications system 100 includes a primary station 101, in one embodiment a primary transceiver, coupled to a plurality of secondary stations 110, 112, 114, and 116, in one embodiment operating as transceivers, via a communications medium 115. In the preferred embodiment, the communications medium 115 is hybrid network, including optical fiber and coaxial cables. As is well-known to those skilled in the art, in other embodiments, the communications medium may be coaxial cable, fiber optic cable, twisted pair copper wires, etc., and may also include the air, atmosphere or space for wireless and satellite-based communication. The primary station 101 is also coupled to a network 105, which may include networks such as the Internet, online services, telephone and cable television networks, and other communications systems. In other embodiments, the secondary stations 110, 112, 114, and 116 can be connected to more than one primary station, and further can be connected to each primary station by a plurality of communications media, such as those mentioned above. Also, the network 105 is not a required element of the invention, as the inventive concepts can be employed over the communications medium 115.

In the preferred embodiment, the communication medium 115 has or supports a plurality of communications channels. For ease in reference, the communications channels in which the primary station 101 transmits information signals or other data to a secondary station, such as the secondary station 114, are referred to as downstream channels. Similarly, the communications channels in which the secondary station 114 transmits information signals or other data to the primary station 101 are referred to as upstream communications channels. As is known to those skilled in the art, the upstream and downstream channels may be the same physical channel (through the use of time division, frequency division or code division multiplexing, for instance) or may be separate physical channels. As mentioned above, in the preferred embodiment of the Cable-Comm™ System, the communications medium is hybrid fiber coaxial cable, with downstream channels in the frequency spectrum of 88–860 MHz, and upstream channels in the frequency spectrum of 5–42 MHz.

Dependent upon the specific application of the present invention, the primary station 101 can be a simple transmitter for point-to-point or point-to-multipoint communications with one or more of the secondary stations 110, 112, 114, and 116. In another embodiment, the primary station 101 can be a bi-directional transceiver for point-to-point and point-to-multipoint communications with the secondary stations 110, 112, 114, and 116. In the embodiment where the primary station 101 is an element of the CableComm™ System, the primary station 101 includes a plurality of processors, memory units, receivers and transmitters for bi-directionally communicating with each of the secondary stations 110, 112, 114, and 116 to provide differentiated signals in both the upstream and downstream directions. The one or more processors provide functions related to upstream and downstream data protocols, such as sending polling messages or acknowledgment messages. Essentially, the processors control the various functions associated with the primary station 101. Each of the receivers may include a Motorola 68302 processor, a Motorola 56000 series digital signal processor, a ZIF SYN integrated circuit available from Motorola of Schamburg, Ill., and an LSI Logic L64714 (Reed-Solomon decoder) available from LSI Logic of Milpitas, Calif., for demodulation and for decoding forward error correction and cyclic redundancy correction bytes. In the preferred embodiment, also depending upon the functions implemented, each of the transmitters may include a Motorola 68302 processor, a Motorola 56000 series digital signal processor, a ZIF SYN integrated circuit and an LSI Logic L64711 (Reed-Solomon encoder) for modulation and for coding for forward error correction and cyclic redundancy checks. As a consequence, as used herein, the primary station 101 may perform all the functions of data and other signal reception and transmission, regardless of the specific hardware implementation and additional features that may or may not be implemented. Finally, the primary station includes a network interface device (which are well-known in the art) for interfacing with the network 105 in those embodiments where the network 105 is included. Commonly assigned U.S. Pat. No. 5,699,365 (as discussed above) can be consulted for additional details of the primary station 101 as used in a CableComm™ System application.

Likewise, each secondary station 110, 112, 114 and 116 includes a processor and memory unit for receiving and sending bi-directional communications via the communication media 115. Each secondary station can further be connected to data terminal equipment for processing digital data received by the secondary station. In one embodiment, the components of the secondary stations 110, 112, 114, and 116 perform such functions as QAM demodulation and forward error correction decoding (for downstream signals), QPSK modulation and forward error correction encoding (for upstream transmission), and transmit level and frequency adjustment, regardless of the specific hardware implementation. In the preferred embodiment, the processor for controlling each of the secondary stations 110, 112, 114, and 116 is a Motorola M68302 processor (also known as an integrated multiprotocol processor), including associated memory. The processor is coupled to an Ethernet port or an RS232 interface for connection to a computer, workstation, or other data terminal equipment. The processor is also coupled to a channel interface unit for communications over the communications medium 115. The channel interface unit, depending upon the functions implemented, can include a Motorola 68HC11 integrated circuit, a ZIF SYN integrated circuit, a Broadcom BCM 3100 QAMLink integrated circuit available from Broadcom of Irvine, Calif., a Motorola TxMod integrated circuit, and LSI Logic L64711 and L64714 integrated circuits for performing the aforementioned functions. Commonly assigned U.S. Pat. No. 5,699, 365 (as discussed above) can be consulted for additional details of the secondary stations 110, 112, 114, and 116 as used in the CableComm™ System application.

As discussed above, the upstream channels of the communications medium in the preferred CableComm™ System are in the frequency range between 5 and 42 MHz and may be susceptible to interference from multiple noise sources. Similarly, wireless communications systems are susceptible to noise sources that disrupt the channel on a random and unpredictable basis. Forward error correction is preferably employed in a communications channel, for instance on the upstream channel with respect to the preferred embodiment, to compensate for data transmission errors that may have been caused by noise or other distortions. Forward error correction comprises an error correcting code that is appended to the information bits or application bits to allow a receiver to detect and correct certain types and sizes of errors that may have occurred during data transmission. The transmitting unit, such as a secondary station 112, generates the error correcting code from the information data and appends the error correcting code to the information data for transmission. The receiving unit, such as the primary station 101 uses the error correcting code to detect received errors in the information data and to correct as many detected errors as permitted by the number of error correcting bits (or bytes). As a consequence, the receiving unit must know, prior to the receipt of the data, the type of error correcting code employed at the transmitter so that proper decoding and error correction can be accomplished at the receiver. This exchange of forward error correction parameters may be accomplished by prior arrangement during a parameter exchange message sequence, which may occur at fixed periodic intervals or at sporadic intervals that coincide with changes in the quality of the communications link.

The preferred embodiment of the present invention allows optimization of a Reed-Solomon error correcting code for forward error correction, such as used on the upstream channel. The downstream channel uses a Reed-Solomon error correcting code with a variable interleaver. The Reed-Solomon error correcting code is a block error correcting code where the error correcting code is computed over a fixed-size block of data. A Reed-Solomon code is typically specified by a parameter pair (n, k), in which "n" is the code word size and "k" is the block size (i.e., the number of information bytes). An n-byte code word therefore consists of k information bytes and (n–k) error correcting code bytes. The maximum number of symbol errors (where a symbol is typically one 8-bit byte) that can be corrected by a Reed-Solomon code is $t=(n-k)/2$. One commonly used Reed-Solomon code is a (128, 122) code, where the code word size is 128 bytes with each code word comprising 122 information bytes and 6 error correcting code bytes. A decoder operating on this data can therefore correct up to three distinct byte errors in the 128-byte code word. By distinct, it is meant that the three byte-errors do not have to be consecutive bytes. The teachings of the present invention can be applied to other error correcting codes, such as other block codes or block codes used in conjunction with concatenated codes.

In a typical prior art forward error correction implementation, the forward error correction parameters are set to a predetermined and fixed value to compensate for a particular level of expected noise on the communications channel. If the noise level increases above the expected level, the forward error correction scheme will be unable to correct all of the transmission errors. The corrupted data must therefore be retransmitted or, in a worst case situation, the communications channel may no longer be usable. The data through-put is significantly decreased due to the retransmission time, or in the worst case eliminated. Similarly, if the noise level decreases below the expected level, the realized data through-put will be less than the maximum supportable by the channel as a result of an excessive number of corrections bytes which are not necessary.

Establishing the forward error correction parameters requires balancing the amount of overhead added by the error correcting code (because the error correcting codes utilizes bandwidth that could have been used for information and therefore decreases information through-put) and the amount of error correction needed due to channel conditions (which may serve to increase data through-put through avoidance of retransmission). In the optimum situation, to maximize through-put of information over a given communications channel, the error correcting code would utilize precisely enough error correction to compensate for the existing noise level, no more or no less. More error correcting capability lowers through-put due to the excessive overhead of transmitting error correcting codes that are not needed. Insufficient forward error correcting power lowers the through-put due to the overhead created by the retransmission of information received in error. However, the level of noise on a communications channel varies over time, therefore rendering the selection of a fixed set of forward error correction parameters less than optimal at any given time. One prior art method, as mentioned above, selects a fixed set of forward error correction parameters to compensate for a typical or anticipated noise level, but ceases to use the communication channel when the noise exceeds a specified threshold. Obviously, this prior art method utilizing fixed error correcting code parameters is not optimal in those situations where a limited number of communication channels are available. Further, it is important to minimize the through-put delay or latency introduced by the communications equipment, e.g., the receiver of a communications system. Throughput delay in a polled protocol, for example, may be defined as the time between the sending of a polling message prior to forward error correction encoding and the receipt of a response to the polling message following forward error correction decoding. The forward error correcting codes typically introduce additional throughput delay at the communications equipment due to the processing and computational time requirements for error correction encoding and decoding. The amount of through-put delay is typically proportional to the error correcting power of the code. For example, the delay introduced by the interleaving/de-interleaving process is proportional to the interleaver depth, and the delay introduce by the Reed-Solomon encoding/decoding process is proportional to the code word size and the number of error correcting bytes. Further when utilizing block forward error correcting codes, the entire code block must be received before the decoding can be completed, thus it is impossible to correct the first bits of the transmission prior to receipt of the final bits.

As discussed in greater detail below, the apparatus and method of the present invention provides a technique for changing the forward error correction parameters in a communications channel between two or more data communications stations based on predictions of noise burst duration and the rate of noise burst hits or occurrences. The duration and rate of the noise burst is predicted based on collected samples and statistics calculated from the error vector magnitude of the received signal. The forward error correction configuration parameters are communicated between the receiving and transmitting stations as they dynamically change.

Data streams to which the teachings of the present invention are applied are divided into forward error correction frames, also referred to as code words. Each code word is divided into two portions: the application or information data portion that conveys information to the receiving station and is to be corrected in the event errors arise, and a error correction portion that allows the receiving station to detect and correct errors in the application or information data. The error correcting portion of the code word is also referred to as the correction bytes, check bytes, or checksum. The correcting power of any forward error correction scheme can be increased by increasing the number of correction bytes, decreasing the overall code word length or performing both of these operations. However, increasing the forward error correction power decreases the maximum channel data through-put as a result of the increased number of error correction overhead bytes. Similarly, decreasing the forward error correction power increases the maximum data through-put as a direct result of lower forward error correction overhead. Finally, the latency is decreased whenever the number of error correction bytes or the code word length is decreased. In an ideal world in which the rate and duration of noise bursts that corrupt data bits within the communications channel are known a priori and are constant, the two forward error correction parameters, code word length (CW_LENGTH) and number of correction bytes (CB_LENGTH) are calculated as follows:

$$CW\_LENGTH=(\text{number of bits between the start of each noise burst})/8 \quad (1)$$

$$CB\_LENGTH=2*(ROUND\_UP((\text{duration of each noise burst in bits})/8)+1) \quad (2)$$

According to equation (1), CW_LENGTH is equal to the noise burst period, defined as the number of bytes occurring between the start of successive noise bursts. Using this value for the CW_LENGTH ensures that each code word will be interrupted by only a single noise burst. The number of correction bytes (CB_LENGTH) is calculated to ensure the correction of all byte errors occurring during the duration of the noise burst and is given in equation (2). The Reed-Solomon forward error correction algorithm operates on whole bytes. If the noise burst spans a single bit in a byte, then the entire byte is considered corrupted. Therefore, the calculated CB_LENGTH must consider noise bursts which do not begin or end exactly on a byte boundary. (The ROUND_UP function and the "+1" correct for such noise/byte misalignment.) The multiplication by two factor is required because the Reed-Solomon forward error correction algorithm requires twice as many check bytes as the number of information bytes to be corrected. According to these equations, the communications medium 115 supports the transmission of (CW_LENGTH−CB_LENGTH) information or application data bytes during each code word transmission, followed by a number of error correction bytes equal to CB_LENGTH. Of course, the noise burst duration and period are not known in advance nor are they constant, and therefore they must be statistically estimated in accordance with the teachings of the present invention.

The present invention determines the duration and the period of noise bursts by using the error vector magnitude (also referred to as the slicer error) provided by the slicer function (the point at which the analog signal is converted into the digital bit stream) of the receiver. The error vector magnitude represents the noise-induced error associated with the decoding of the digital signal into analog form. In essence, this error value represents the uncertainty that a specific digital bit was in fact decoded correctly. Because noise is present on the channel, there is always some probability that a digital bit decoded as a one was in fact transmitted as a zero, due to the introduction of additive channel noise during transmission. The error vector magnitude represents the magnitude of this error. The deterministic error vector magnitude values are used to create continually updated statistical mean and variance estimates that statistically describe the duration and period of noise burst events, which statistics are utilized to calculate the optimum forward error correction parameters. In one implementation, the teachings of the present invention can improve throughput efficiencies by as much as 25%. While the error vector magnitude calculation required by this algorithm is not a common metric provided by most commercial-off-the-shelf (COTS) receiver chips, other opportunities exist for generating such a metric. Specifically, implementation of the receiver in a programmable digital signal processor such as the Motorola 56003 allows for the programming of the error vector magnitude calculation during the bit slicing function. Similarly, implementation of a receiver within an application specific integrated circuit (ASIC) would also allow for implementation of the error vector magnitude calculation, by designing this function into the ASIC.

A noise burst is declared, based on the error vector magnitude, when two conditions are met. First, the error vector magnitude must exceed a threshold value ($EVM_{max}$) that would likely introduce errors into the data transmission system. Error vector magnitudes below the threshold are deemed created by noise bursts that are not statistically significant and therefore unlikely to cause errors in the transmitted data. The value for $EVM_{max}$ is chosen as a function of the modulation type employed on the communications medium 115 and the maximum allowable bit error rate that can be tolerated by system users. For example, if a communication channel is utilizing a 16 QAM modulation and the maximum allowable bit error rate is $1\times10^{-6}$, then the maximum error vector magnitude would be approximately 21 dB. Curves showing the relationship between the bit error rate and the error vector magnitude for different modulation types are readily available in communications textbooks, including *Digital Communication Receivers— Synchronization, Channel Estimation, and Signal Processing* by Heinrich Meyr, Marc Moeneclaey, and Stefan A. Fechtel, John Wiley and Sons, Inc, New York, 1998.

Second, the measured error vector magnitude must reflect a sudden increase relative to past values. This condition is imposed because the forward error correction algorithm of the present invention is better suited for correcting burst errors caused by noise, rather than correcting randomly distributed bit errors, although some improvements will be noted for randomly distributed noise through the use of the present invention. To evaluate whether the second condition is satisfied, the present invention calculates two sliding window averages of error vector magnitudes. See FIG. 2, where the horizontal axis represents time, with each vertical hash mark identifying the time at which an error vector magnitude sample is collected. One sliding window value represents the average or expected error vector magnitude in the absence of noise bursts (referred to as the $EVM_{floor}$ value in FIG. 2). This initial value of this parameter can be calculated at system start-up. As shown, the $EVM_{floor}$ value is calculated between error vector magnitude samples n and m−1. The second sliding window is a test window during which a plurality of measured error vector magnitudes are averaged to determine whether a noise burst occurred (referred to as the $EVM_{test}$ value in FIG. 2). If a burst did not occur at a given sample time during the second window, between samples m and p, for example, then the $m^{th}$ sample is used to recalculate the error vector magnitude floor. Thus, the $EVM_{floor}$ value (recall this is an average value) is recalculated using the EVM values from sample (n+1) to sample m. The $EVM_{floor}$ value calculation is a sliding window of a fixed length; as later sample values are added to the right, sample values are dropped from the left. In another embodiment, the $EVM_{floor}$ sample window size can be variable. Also, if a noise burst was not detected at the $EVM_{test}$ sample window (recall this is also an average value), then the $EVM_{test}$ sample window is recalculated using the samples (m+1), (m+2) . . . (p+1). Both sliding window durations (over which values are averaged) can be as long as or short as a single sample value.

In the operation of the present invention, each $EVM_{test}$ value determined at sample times m, (m+1), (m+2) . . . p, is compared with the $EVM_{floor}$ value plus a small delta or variance value. The $EVM_{test}$ value is also compared to the threshold $EVM_{max}$ value mentioned above. If both tests are affirmative, then the existence of a noise burst is declared.

Once a noise burst has been declared, the duration of the noise burst (in bits) and the period between the start of successive bursts (also in bits) are measured as the $EVM_{test}$ window slides to the right. The mean and variance of the burst duration and period are then calculated, from which the optimum CW_LENGTH and CB_LENGTH values are derived, in accordance with equations (1) and (2) above. Specifically, once the mean and variance values are calculated and a probability density function (PDF) is assumed (generally a normal distribution would be expected) for both the burst duration and period, the probability that a value of CW_LENGTH and CB_LENGTH will correct all bursts can be calculated. For example, if it is desired to correct 95 percent of the noise errors, the PDF for noise duration yields the noise duration value "X" for which 95 percent of the noise-induced errors will be equal to or shorter. Similarly, the PDF for noise arrival period (or noise burst period) will yield a value "Y" for which 95 percent of the periods will be equal to or longer. Equations (1) and (2) are then used to calculate CW_LENGTH and CB_LENGTH, based upon the X and Y values. Conversely, one can choose the desired confidence level and then calculate CW_LENGTH and CB_LENGTH to achieve that probability based on the mean and variance values and the assumed probability density function. (See Sections 5.3–5.5 of *Probability and Statistical Inference—Second Edition* by Robert V. Hogg and Elliot A. Tanis. Macmillan Publishing Co., Inc. New York, 1983 for a complete description of confidence intervals and their calculations.)

Figure 2:
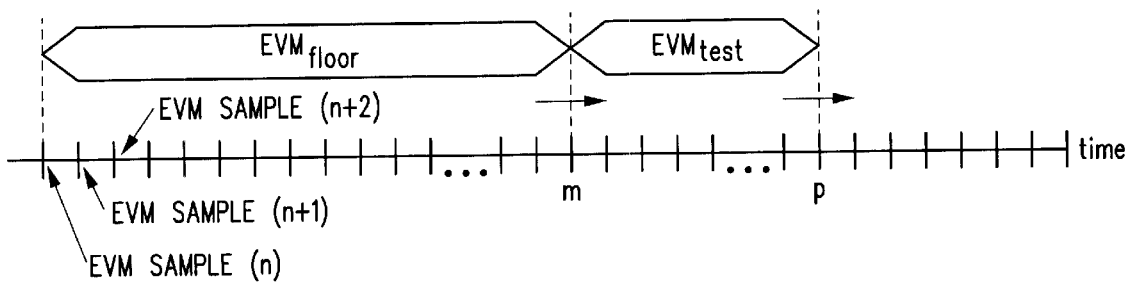
FIG. 2 is an illustration of the error vector magnitude sliding windows.
Figure 3:
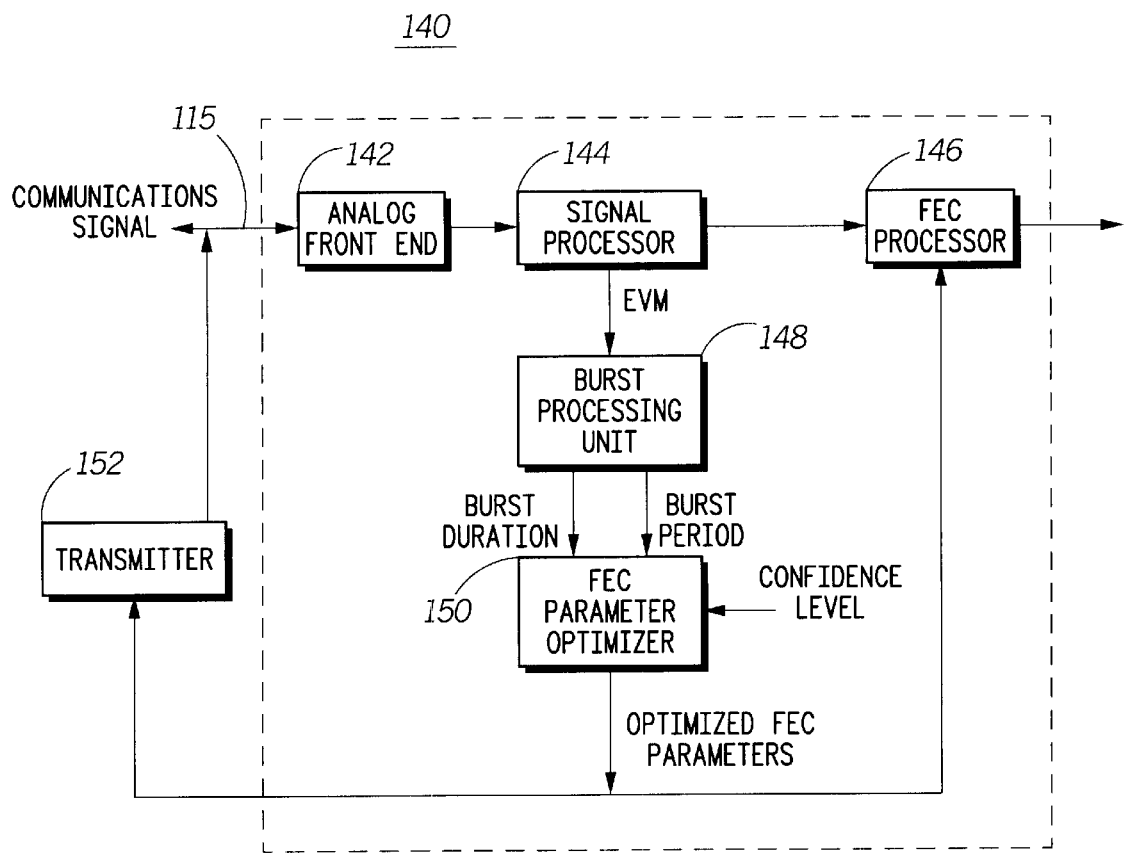
FIG. 3 is a block diagram of common receiver architecture.

FIG. 3 is a block diagram of a receiver 140 employing the teachings of the present invention. A communications signal carried over the communications medium 115 is input to an analog front end (e.g., including filters, amplifiers, tuners, as is well-known to those skilled in the art). The analog signal output from the analog front end 142 is input to a signal processing module (e.g., including an analog to digital converter, matched filter, phase derotator and bit slicer). A bit stream produced by the signal processor 144 is input to the forward error correction processor 146 to be further discussed herein below. In one embodiment, both the signal processor 144 and the forward error correction processor 146 are implemented using a digital signal processor. The corrected bit stream is produced by and output from the forward error correction processor 146, using the checksum bytes appended to the received code word. The receiver 140 also determines the error vector magnitude values, and calculates the optimum forward error correction parameters in accord with the teachings of the present invention. Returning to the signal processor 144, the error vector magnitude is output therefrom to a burst processing unit 148. The error vector magnitude is derived in the bit slicer portion of the signal processor 144 during each sample time, as illustrated in FIG. 2. The noise burst duration and burst period values determined within the burst processing unit 148 (to be discussed further herein below) are input to a forward error correction parameter optimizer 150. The details of the forward error correction parameter optimizer 150 will be discussed in conjunction with FIG. 6 below. A confidence level value is input to the forward error correction optimizer 150 for use in calculating the optimal parameters. The optimized forward error correction parameters (CW_LENGTH and CB_LENGTH) are input to a transmitter 152 and transmitted over the communications medium 115 for implementation in the data stream sent by the transmitter communicating with the receiver 140. The optimized forward error correction parameters are also input to the forward error correction processor 146 for implementation in correcting the received bit stream.

Figure 4:
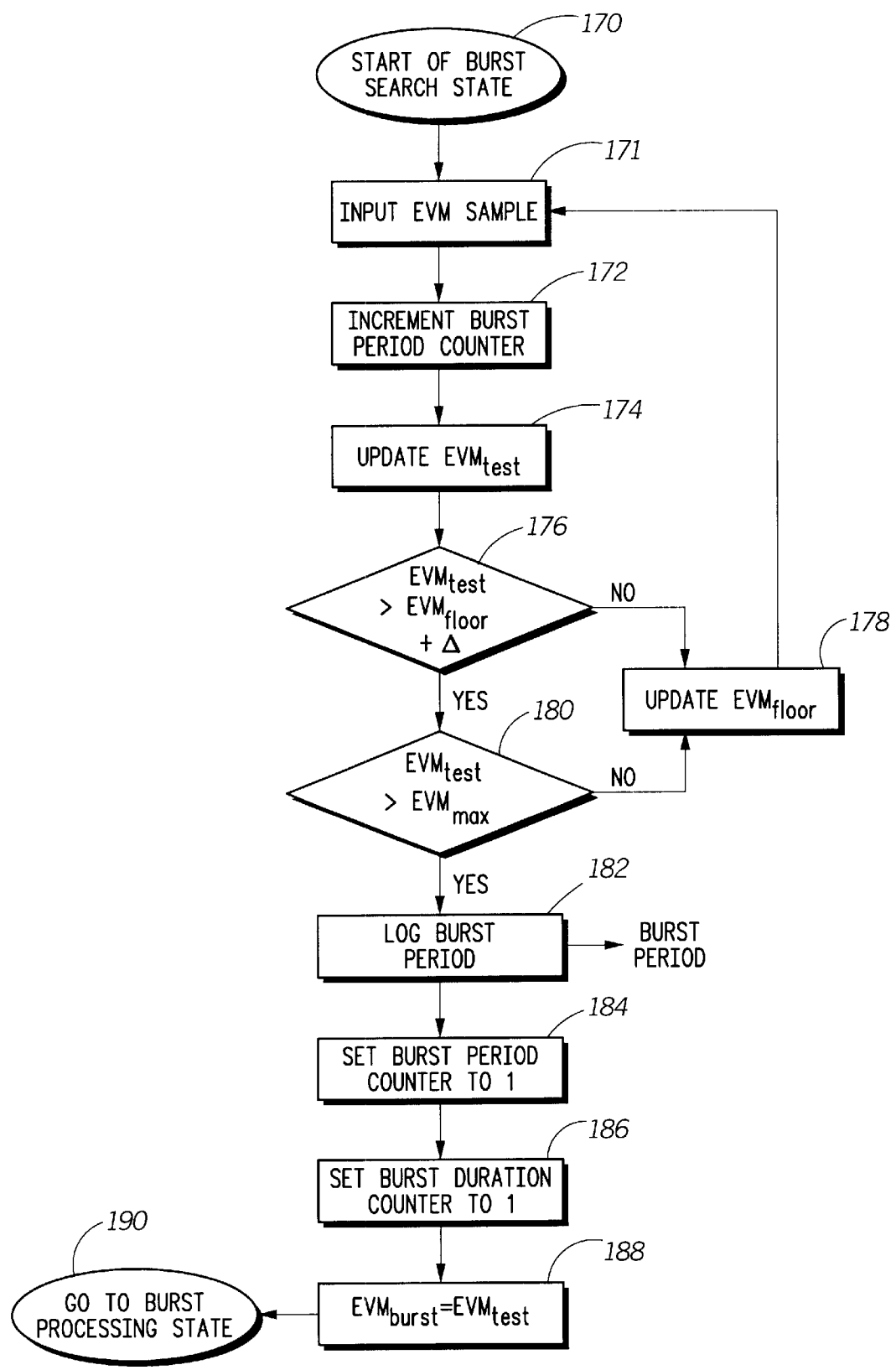
FIGS. 4, 5 and 6 are flowcharts implementing the teachings of the present invention.
Figure 5:
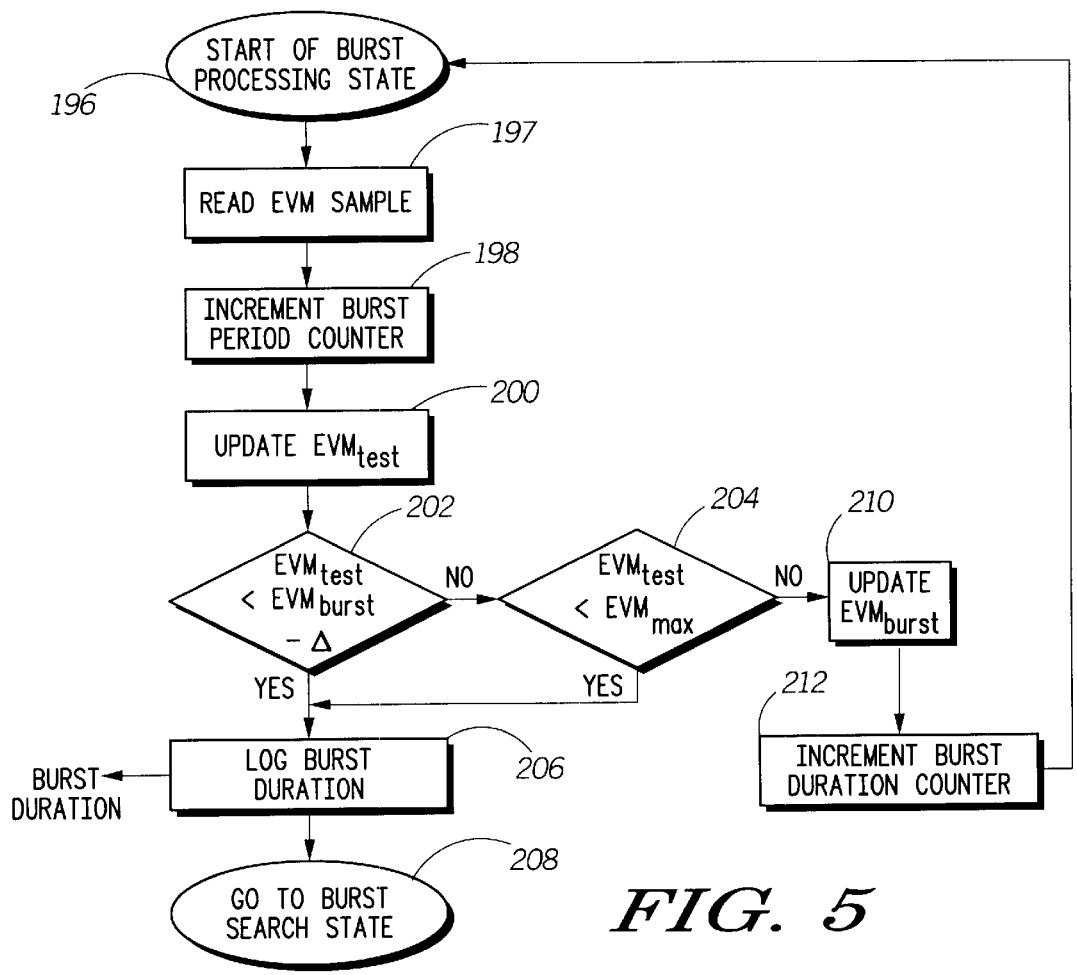

FIGS. 4 and 5 illustrate the processes implemented within the burst processing unit 148 for identifying the occurrence of a burst, determining the burst period (FIG. 4) and determining the burst duration (FIG. 5). The following values are defined in conjunction with their use in FIGS. 4 and 5:

Error vector magnitude test value ($EVM_{test}$): The average error vector magnitude during a test window, i.e., when the system is attempting to determine whether a noise burst has begun.

Error vector magnitude floor value ($EVM_{floor}$): The average error vector magnitude when a noise burst is not present.

Error vector magnitude maximum value ($EVM_{max}$): The maximum error vector magnitude value that can be tolerated for a given modulation type to achieve a specified bit error rate.

Error vector magnitude burst value ($EVM_{burst}$): The average error vector magnitude during a noise burst event.

Delta: A hysteresis term that prevents unnecessary and ineffectual toggling between the burst search state of FIG. 4 and the burst processing state of FIG. 5.

The FIG. 4 process begins at a step 170 (representing the beginning of the noise burst search state), followed by a step 171 where a new error vector magnitude sample value (the $p^{th}$ sample) is input from the signal processor 144. Recall that an error vector magnitude sample is taken at each sample or symbol increment as illustrated in FIG. 2. The error vector magnitude samples are computed at the signal communications baud rate or symbol rate. In one embodiment, the communications baud rate is 384 kilobaud, which results in an error vector magnitude sample rate of 384 kilobaud; however, any symbol rate can be supported if enough processor power is present in the signal processor 144 to support such calculations at the symbol rate. Processing then moves to a step 172 where the burst period counter is incremented. The value of the burst period counter represents the number of sample or symbol periods since the beginning of the last burst. At a step 174, the error vector magnitude sample input at the step 171 is added to the previous error vector magnitude samples and an average is calculated, representing the error vector magnitude test value (an average) over the sliding window shown in FIG. 2. Note, that the length of the EVM test window may be only one sample or the average of several samples as shown in FIG. 2. At a decision step 176, the computed error vector magnitude test value is compared to the error vector magnitude floor average (representing the error vector magnitude average or expected value without noise on the communications medium 115) plus the delta quantity. If the error vector magnitude test value is less than the error vector magnitude floor value plus delta, then a noise burst is not present, and processing moves to a step 178. Since the last calculated error vector magnitude value did not indicate the beginning of a burst, the error vector magnitude floor value is updated using the $m^{th}$ sample, and the $n^{th}$ sample is dropped from the $EVM_{floor}$ value calculation. The process then returns to the step 171 to input the (p+1) sample value.

If the response at the decision step 176 is affirmative, processing moves to a decision step 180 where the error vector magnitude test value is compared to the error vector magnitude maximum value. The error vector magnitude maximum value is established to avoid declaring the occurrence of a burst when the burst is less than some predetermined maximum value. In one embodiment, the error vector maximum value is approximately 21 dB for 16QAM modulation at a maximum allowable bit error rate of $1 \times 10^{-6}$. If the test at the step 180 is false, processing returns to the step 178 where the error vector magnitude floor value is updated.

If the decision at the decision step 180 is affirmative, then a noise burst began at the $m^{th}$ sample and at a step 182 the burst period is logged or read from the burst period counter. Recall that the burst period counter (see the step 172) stores a value representing the burst period, that is, the elapsed time since the beginning of the previous burst. The burst period, as obtained at the step 182, is input to the forward error correction parameter optimizer 150, as illustrated in FIG. 3, for use in calculating the optimum forward error correction parameters. Since the process of FIG. 4 has detected the beginning of a burst, the burst period counter is initialized to 1 at a step 184. Then at a step 186, the burst duration counter is reset to one, and is incremented during the duration of the burst, as will be discussed in conjunction with FIG. 5. At a step 188, the error vector magnitude burst value is initialized by setting it equal to the error vector magnitude test value. This allows detection of the end of the burst during the burst processing state as will be discussed in the flow chart of FIG. 5. Finally, after the step 188, the process enters the burst processing state 190 as set forth in FIG. 5.

A step 196 of FIG. 5 represents the start of the burst processing state, after which the next error vector magnitude sample is read at a step 197. This is the sample value immediately following the last read sample from the step 171 of FIG. 4 (If the $p^{th}$ sample was read at the step 171 of FIG. 4, then the $p^{th+1}$ sample will be read in step 197 of FIG. 5). At a step 198, the burst period counter, which stores a value representing the time between the bursts, is incremented. The burst period is the elapsed time from the end of a burst to the beginning of the next burst. At a step 200, the error vector magnitude test value is updated using the new error vector magnitude sample (p+1) from the step 197. At a decision step 202, the error vector magnitude test value is compared to the error vector magnitude burst value, less the delta value. Recall that at the step 188 of FIG. 4, the error vector magnitude burst value was initialized to the error vector magnitude test value when the burst was first detected. (the $m^{th}$ sample value). If the result of the decision step 202 is affirmative, then the error vector magnitude test value (i.e., the average over the test window) has declined relative to the burst error vector magnitude indicating that the burst has ended and processing moved to a step 206.

If the result of the decision step 202 is negative, processing moves to a decision step 204 where the error vector magnitude test value is compared to the maximum error vector magnitude. Recall that the maximum error vector magnitude value is dependent upon the modulation type and the desired bit error rate. If the error vector magnitude test value has fallen below the maximum value, then the burst has ended and processing moves to a step 206. Note that an affirmative decision from either of the decision steps 202 or 204 indicates the end of the burst, after which the burst duration value (as incremented at the step 212) is read. This value represents the burst duration signal output from the burst processing unit 148 of FIG. 3. As represented by a step 208, processing then moves back to the burst search state of FIG. 4.

If the responses from both the decision steps 202 and 204 are negative, then the noise burst is continuing. Therefore the error vector magnitude average during the burst ($EVM_{burst}$) is updated at a step 210. The burst duration counter is incremented at a step 212 and processing returns to the beginning of the burst processing state 196. Thereafter, while the burst is extant, processing continues through the FIG. 5 process updating the burst duration counter and the burst period counter, and the average error vector magnitude during the burst ($EVM_{burst}$) based upon a new EVM samples read at the step 197 during each processing cycle.

Figure 6:
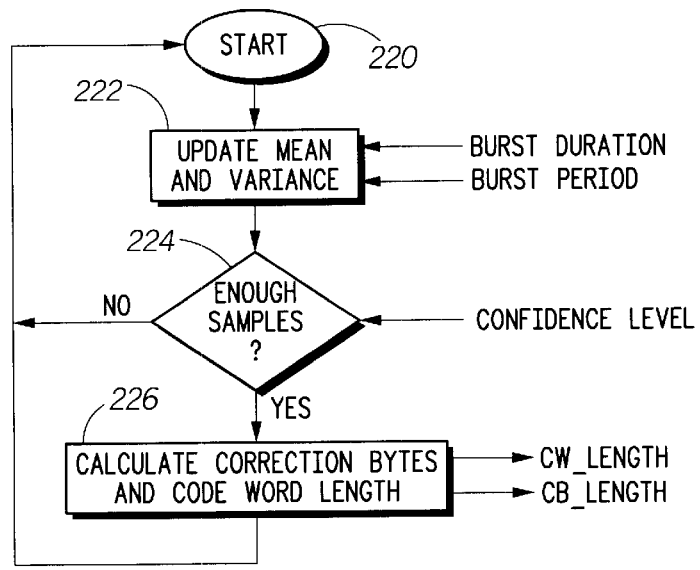

FIG. 6 is a flowchart illustrating operation of the forward error correction parameter optimizer 150. The FIG. 6 process begins at a start step 220 after which processing moves to a step 222 where the mean and variance statistics associated with the burst duration and the burst period (represented as input to the step 222) are updated. The burst duration value is obtained from the step 206 of FIG. 5 and the burst period value is obtained from the step 182 of FIG. 4. Processing then moves to a decision step 224 receiving as an input a user determined confidence level representing the probability that the calculated forward error correcting power will correct all byte errors occurring during data transmission. At the decision step 224, a determination is made whether a sufficient number of burst duration and burst period samples have been taken to achieve the desired confidence level. The reader is directed to Section 5.6 "Sample Size" of *Probability and Statistical Inference—Second Edition* by Robert V. Hogg and Elliot A. Tanis. Macmillan Publishing Co., Inc. New York, 1983 for a complete description of how an adequate sample size may be determined. If more samples are required, processing moves from the decision step 224 back to the start step 220 so that additional samples can be collected before the forward error correction parameters are calculated. When enough samples have been taken, processing moves from the decision step 224 to a step 226 where the error correcting parameters of code word length and number of correction bytes are calculated from equations (1) and (2), using the variance and mean values from the step 222 and the confidence level input to the step 224. The reader is directed to section 5.3, 5.4 and 5.5 of *Probability and Statistical Inference—Second Edition* by Robert V. Hogg and Elliot A. Tanis. Macmillan Publishing Co., Inc. New York, 1983 for a complete description of how parameters may be estimated based upon variance, mean, and confidence intervals. These parameter values are transmitted to the transmitter 152 as shown in FIG. 3. Thus as the noise channel conditions change, the error vector magnitudes will change, and the processes of FIGS. 4, 5 and 6 will change the forward error correction parameters CW_LENGTH and CB_LENGTH as applied to transmitted data stream.

While the invention has been described with reference to a preferred embodiment, it will be understood by those skilled in the art that various changes may be made and equivalent elements may be substituted for element thereof without departing from the scope of the present invention. In addition, modifications may be made to adapt the teachings of the invention to a particular situation without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for adaptively determining forward error correction parameters to be applied to code words conveyed, via asynchronous transmission, over a communication channel, for detecting and correcting certain errors in the code words, wherein the code words include an information portion and an error correcting portion, said method comprising:

(a) determining at least one statistical metric representing noise occurrences on the communications channel; and (b) establishing an attribute of the code word based on the statistical metric, the attribute comprising a length of the code word.

2. The method of claim 1 wherein the attribute is the length of the error correcting portion.

3. The method of claim 1 wherein the attribute is the information portion length.

4. The method of claim 1 wherein step (a) comprises:

determining a first statistical metric representing the period for noise bursts occurring on the communications channel;

determining a second statistical metric representing the duration of noise bursts occurring on the communications channel; and wherein the attribute of the code word is based on the first and the second statistical metrics.

5. The method of claim 4 wherein the first statistical metric is the average noise burst period.

6. The method of claim 4 wherein the first statistical metric is the average and the variance noise burst period.

7. The method of claim 4 wherein the second statistical metric is the average noise burst duration.

8. The method of claim 4 wherein the second statistical metric is the average and the variance noise burst duration.

9. The method of claim 4 wherein the first and the second statistical metrics are based on a number of samples so as to produce statistically valid first and second statistical metrics.

10. The method of claim 4 wherein the first and the second statistical metrics are based on a number of sample values so as to provide a predetermined confidence level for the first and the second statistical metrics.

11. The method of claim 1 wherein the code words are conveyed over the communications channel in the form of a modulated carrier signal, and wherein the step (a) is executed during the process of converting the carrier signal to a digital baseband signal.

12. The method of claim 1 wherein the code words are conveyed over the communications channel between a transmitting site and a receiving site, wherein the code word attributes are implemented at the transmitting site, wherein the at least one statistical metric is determined at the receiving site, and wherein the at least one statistical metric is provided as an input to the transmitting site for use in establishing an attribute of the code word based on the input statistical metric.

13. The method of claim 1 wherein the step (b) includes receiving an externally provided confidence level representing the probability that the established code word attribute will allow the correction of errors in the information portion of the code word in accord with a probability determined by the confidence level.

14. A method for adaptively determining forward error correction parameters for a communications channel conveying, via asynchronous transmission, code words, including an information portion and an error correcting portion, wherein the communications channel includes a receiver for producing a digital signal in response to the code words, wherein each code word includes a plurality of data symbols, and wherein the uncertainty of a data symbol value is the error vector magnitude, said method comprising:

(a) determining an error vector magnitude floor;

(b) comparing the error vector magnitude floor with error vector magnitude values;

(c) determining the duration of a noise burst as the time during which the error vector magnitude value exceeds the error vector magnitude floor;

(d) determining the period between consecutive noise bursts; and (e) determining one or more forward error correction parameters based on the noise burst duration and the noise burst period, wherein at least one forward error correction parameter establishes a length of the code words.

15. The method of claim 14 wherein the error vector magnitude floor is the average of the error vector magnitude value over a plurality of error vector magnitude samples during which a noise bursts is not present.

16. The method of claim 14 wherein step (b) further comprises comparing the error vector magnitude floor with each error vector magnitude value as determined for each data symbol.

17. The method of claim 14 wherein the error vector magnitude value is the average error vector magnitude value calculated for a plurality of data symbols.

18. The method of claim 14 wherein the noise bursts period is the average noise burst period for a plurality of noise bursts.

19. The method of claim 14 wherein the noise burst duration is the average noise burst duration for a plurality of successive noise bursts.

20. The method of claim 14 further comprising a step (f), recalculating the error vector magnitude floor using the error vector magnitude value when a noise burst is not present.

21. A method for adaptively determining forward error correction parameters to be applied to code words conveyed, via asynchronous transmission, between a first device and a second device, wherein the code words include an information portion and an error correcting portion, said method comprising:

(a) determining at least one statistical metric representing noise that can corrupt one or more code words; and (b) establishing a length of the code word based on the statistical metric.

22. The method of claim 21 wherein the code word attribute is selected from the group comprising the length of the code word and the length of the error correcting portion.

23. The method of claim 21 wherein the statistical metric is the average and variance noise burst period.

24. The method of claim 23 wherein the noise burst period is measured as the time between the start of consecutive noise bursts.

25. The method of claim 23 wherein the noise burst period is measured as the time between the end of consecutive noise bursts.

26. The method of claim 21 wherein the statistical metric is the average and variance noise burst duration.

27. The method of claim 21 wherein each of the first and the second devices selectively operates in either a transmitting or a receiving mode, wherein the step of establishing an attribute of the code word based on the statistical metric is executed at the receiving device and conveyed to the transmitting device for application to code words subsequently conveyed from the transmitting device to the receiving device.

28. The method of claim 27 wherein in the receiving mode a decoder receives the code words for producing the error vector magnitude value for each data symbol of the code word.

29. An article of manufacture comprising:

a computer program product comprising a computer-readable medium having a computer-readable code therein for adaptively determining forward error correction parameters for a communications channel conveying, via asynchronous transmission, code words including an information portion and an error correcting portion, in the form of data symbols, wherein the communications channel is responsive to a receiver responsive to the signal carried over the communications channel for producing a digital signal in response thereto, and wherein the uncertainty of the value of a data symbol is the error vector magnitude, said article of manufacture comprising:

a computer-readable program code module for determining an error vector magnitude value;

a computer-readable program code module for comparing the error vector magnitude floor with the error vector magnitude values;

a computer-readable program code module for determining the duration of a noise burst as the time when the error vector magnitude value exceeds the error vector magnitude floor;

a computer-readable program code module for determining the period of consecutive noise bursts; and a computer-readable program code module for determining one or more forward error correction parameters based on the noise burst duration and the noise burst period, wherein a length of the code words is established by the forward error correction parameters.

30. An apparatus for adaptively determining forward error correction parameters for a communications channel conveying, via asynchronous transmission, a signal from a first transmitter to a receiver, wherein the signal is modulated by code words and wherein each code word includes an information portion and an error correcting portion, in the form of data symbols, and wherein the uncertainty of a data symbol within a code word is the error vector magnitude, said apparatus comprising:

at the receiver, a demodulator for demodulating the received signal;

a signal processing module responsive to the demodulator output signal for generating the code words, wherein the signal processing module further generates the error vector magnitude representing the uncertainty of a data symbol value;

a noise burst processing module responsive to the error vector magnitude, said noise burst processing module comprising:

(a) a first module for determining an error vector magnitude floor;

(b) a second module for comparing the error vector magnitude floor with error vector magnitude values;

(c) a third module for determining the duration of noise bursts as the time during which the error vector magnitude exceeds the error vector magnitude floor; and (d) a fourth module for determining the period of consecutive noise bursts;

a parameter optimizer response to the noise burst duration and the noise burst period and further responsive to an externally produced confidence level representing the probability that the forward error correction parameters will correct errors in the code word caused by noise on the communications channel, wherein said parameter optimizer determines forward error correction parameters in response to the confidence level, the noise burst duration and the noise burst period, and wherein a length of the transmitted code words is established by the forward error correction parameters.

31. The apparatus of claim 30 wherein the forward error correction parameters establishes the error correcting portion length.

* * * * *